(12) United States Patent
Denton (10) Patent No.: US 7,433,716 B2
(45) Date of Patent: Oct. 7, 2008

(54) COMMUNICATION APPARATUS

(75) Inventor: James Denton, San Diego, CA (US)

(73) Assignee: Nokia Corporation, Espoo (FI)

( * ) Notice: Subject to any disclaimer, the term of this patent is extended or adjusted under 35 U.S.C. 154(b) by 661 days.

(21) Appl. No.: 11/077,190

(22) Filed: Mar. 10, 2005

(65) Prior Publication Data

US 2006/0205426 A1    Sep. 14, 2006

(51) Int. Cl.
*H04B 1/38* (2006.01)
*H04M 1/00* (2006.01)

(52) U.S. Cl. .............. 455/569.1; 455/518; 455/570; 455/79

(58) Field of Classification Search ............... 455/518, 455/517, 415, 416, 417, 418, 419, 519, 450, 455/452.1, 515, 520, 521, 569.1, 570, 569.2, 455/79, 550.1, 452.2; 379/142.14, 420.01–420.04, 379/433.02
See application file for complete search history.

(56) References Cited

U.S. PATENT DOCUMENTS

| 5,734,724 | A | 3/1998 | Kinoshita et al. ............ 381/17 |
| 6,882,971 | B2 * | 4/2005 | Craner ...................... 704/246 |
| 6,954,522 | B2 * | 10/2005 | Creamer et al. ........ 379/142.14 |
| 2003/0044002 | A1 * | 3/2003 | Yeager et al. ............... 379/444 |
| 2006/0003784 | A1 * | 1/2006 | Chion et al. ................ 455/518 |

FOREIGN PATENT DOCUMENTS

WO    WO 03/022001    3/2003

\* cited by examiner

*Primary Examiner*—John J Lee
(74) *Attorney, Agent, or Firm*—Perman & Green, LLP (57) ABSTRACT

A communication apparatus is described that automatically allocates the position of participants in a group call at various positions in sound-space. The position of each user is such that the user can distinguish between each participant of the call by the position of their voice. This allows the user to visualise the location of each user, without having to manually determine the position of each user.

15 Claims, 5 Drawing Sheets

| ID Number | Weight on Left Channel (%) | Weight on Right Channel (%) |
|---|---|---|
| 2 | 100 | 0 |
| 4 | 50 | 50 |
| 3 | 0 | 100 |

Figure 4

| ID Number | Weight on Left Channel (%) | Weight on Right Channel (%) |
|---|---|---|
| 2 | 100 | 0 |
| 4 | 50 | 50 |
| 3 | 0 | 100 |
| 5 | 75 | 25 |

Figure 7

COMMUNICATION APPARATUS

BACKGROUND OF THE INVENTION

The present invention relates to a communication apparatus operable to communicate with a plurality of devices, each device having a respective identifier Cell phones are known to include press-to-talk functionality. This allows a user to contact other users in a group in a manner akin to a "walkie talkie". A user can define groups of other push-to-talk users, and initiate group calls to a group. Group members that are currently registered with the PTT server, and whose presence is set to available, if applicable, will receive the group call. In a half duplex system, such as push-to-talk, only one user can talk at any one time. The voice of the user who is speaking is provided on a loudspeaker of the cell phones of all the other users. Some phones allow default audio output options, such as choosing between loudspeaker or handset audio output.

As one of a number of users may talk at any given time, there is sometimes confusion over which member of the group is speaking. This usually requires a user to identify him or herself before speaking. This hinders free-flowing conversation.

WO-A-03/022001 describes a method of managing a group call. The contents of this document is herein incorporated by reference. In this document each user may attribute a particular "spatial location" to each of the users in the group call. For example, a user may want the voice of a first user to come from his right side, the voice of a second user to come from directly in front of him and the voice of a third user to come from his left side. However, this requires the user to firstly know which of the other users are available to speak and then to spend time arranging the position of each of the other users. A similar system is described in U.S. Pat. No. 5,734,724 the contents of which also are hereby incorporated by reference.

It is an aim of the present invention to mitigate problems with the prior art by reducing the burden on the user to position each of the other users, whilst still being able to identify each user from their spatial location.

SUMMARY OF THE INVENTION

According to one aspect of the invention, there is provided a communication apparatus operable to communicate with a plurality of devices, each device having a respective identifier, the communication apparatus comprising a processor configured to establish automatically plural weighting factors, each weighting factor to be applied to an audio signal originating from a respective one of the plurality of devices, according to a predetermined criterion in order to provide an audible distance between said devices when said audio signals are output from at least two speakers.

This allows a user, which is communicating with the plurality of devices, to visualise each of the users of the plurality of devices in different locations around him or her. The location of each of the users of the devices is determined automatically.

The predetermined criterion may be dependent upon the number of devices for which weighting factors have been established. In this case, a weighting factor established for a device may be retained when that device leaves a call, and the weighting factor may be used again when that device subsequently rejoins the call.

A weighting factor established for a device may not be altered during the duration of a call.

Weighting factors established for devices may be maintained for the duration of a call. In this case, the weighting factors may be abandoned at the end of a call.

A weighting factor established for a device may be retained Allen that device leaves a call, and the weighting factor may be used again when that device subsequently rejoins the call. Preferably, in this case, the apparatus is a mobile communications terminal.

A different weighting factor may be established for each device.

The processor may be configured to maximise the audible distance between each of the said devices when output from at least two speakers.

Preferably, the apparatus is a mobile communications terminal.

According to a second aspect of the present invention, there is provided a method of managing a communication apparatus which is operable to communicate with a plurality of devices, each device having a respective identifier, the method comprising establishing automatically plural weighting factors, each weighting factor to be applied to an audio signal originating from a respective one of the plurality of devices, according to a predetermined criterion in order to provide an audible distance between said devices when said audio signals are output from a plurality of speakers.

The predetermined criterion may be dependent upon the number of devices for which weighting factors have been established.

The weighting factor established for a device may be retained when that device leaves the call, and the weighting factor may be used again when that device subsequently rejoins the call.

According to a third aspect of the present invention, there is provided a computer program for use with a communication apparatus which is operable to communicate with a plurality of devices, each device having a respective identifier, the program comprising computer code for performing the step of establishing automatically plural weighting factors, each weighting factor to be applied to an audio signal originating from a respective one of the plurality of devices, according to a predetermined criterion in order to provide an audible distance between said devices vixen said audio signals are output from at least two speakers. There is also provided a storage medium having a computer program according to the third aspect of the present invention stored therein or thereon.

DESCRIPTION OF THE BEST MODE OF PERFORMING THE INVENTION

Figure 1:
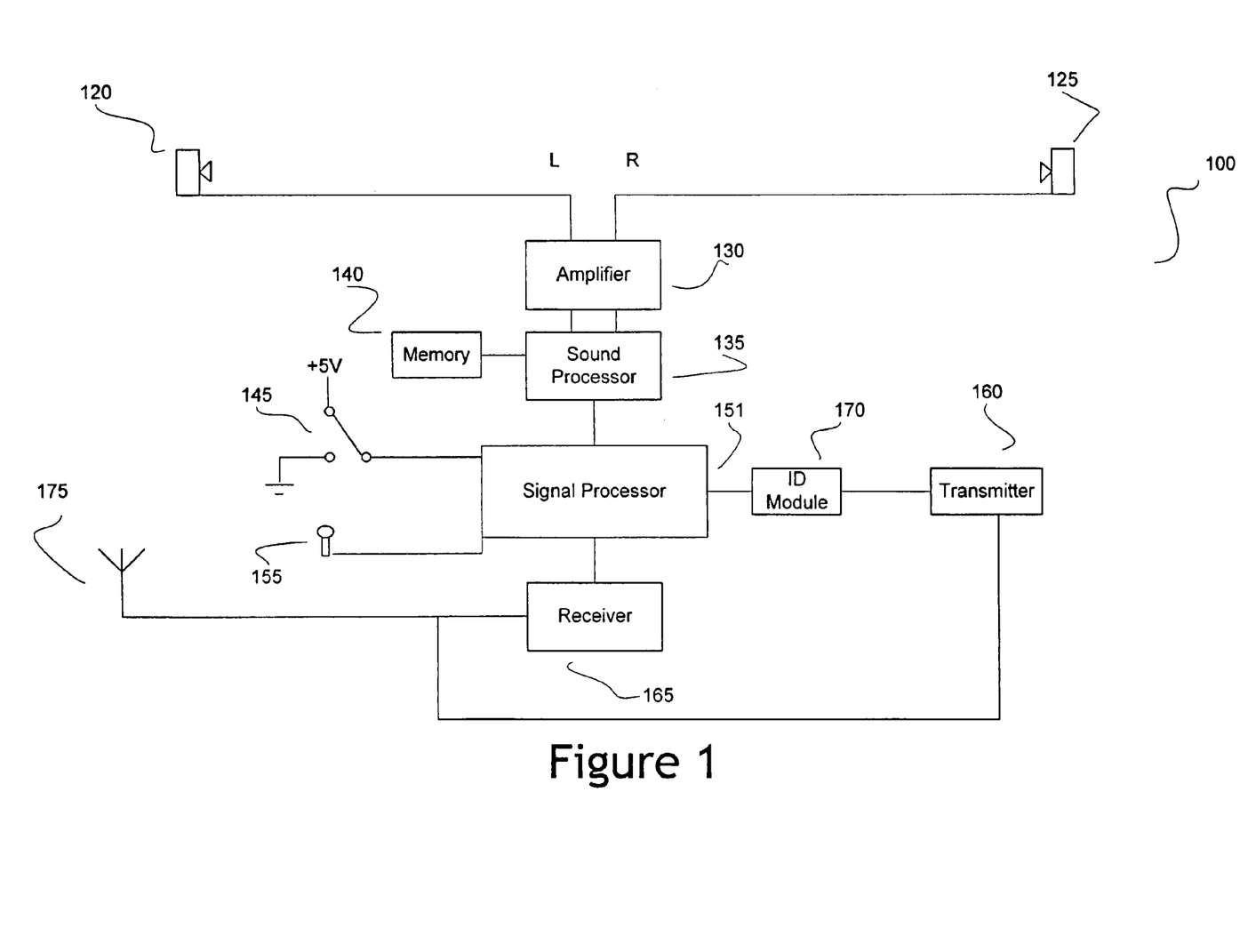
FIG. 1 is a block diagram illustrating components of a communication device according to the present invention.

Referring to FIG. 1, a first cell phone 100 includes an antenna 170. The antenna 170 is connected to a receiver 165 which converts received signals into digital data. The data is fed to a signal processor 150 which controls the operation of the first cell phone 100. A push button 145 is connected between the signal processor 150 and is pushed when a user wishes to speak when the cell phone is operating in push-to-talk (PTT) mode. When the button 145 is pressed, the voltage at the signal processor input 150 is changed from ground to +5 Volts.

A microphone 155 into which the user speaks is also connected to the processor 150. An identification module 170 is connected to the processor 150. A transmitter 160 is connected between the identification module 170 and the antenna 170.

Additionally, a sound processor 135 is connected to the signal processor 150. Memory 140 and an amplifier 130 are connected to the sound processor 135. Left and right stereo speakers 120, 125 are connected to the amplifier 130. These speakers may be part of a pair of stereo headphones, a stereo hands-free kit or the like.

The sound processor 135 generates audio signals on left and right channels, each of which are fed to the amplifier 130 for amplification before feeding to the left and right speakers 120, 125, respectively.

Operation of the first cell phone 100 will now be described with reference to FIGS. 1, 2 and 3.

The user of the first cell phone 100 according to the present invention wishes to communicate with users of second, third, fourth and fifth cell phones 102, 104, 106, 108 respectively using PTT functionality. This is step S10 of FIG. 3.

The user of the first cell phone 100 inputs the contact details, for instance the phone number, of the second, third, fourth and fifth cell phones, 102, 104, 106 and 108. The contact details, as well as the request to communicate using PTT, are forwarded to the network 150 in a first signal 110.

The request is generated within the signal processor 150 and includes details of, for example the cell phone numbers of the second, third, fourth and fifth cell phone 102, 104, 106, 108. The request is passed to the identification module 170, which adds an identifier unique to the first cell phone 100 to the request. The request (including the identifier) is then coded and up-converted in the transmitter 160 and is fed to the antenna 170 for sending to the network 150.

The network 150 forwards the request, along with information identifying the first cell phone 100 to each of the second, third, fourth and fifth cell phones 102, 104, 106, 108 respectively, in a second signal 112. The second signal 112 may be transmitted to each of the second, third, fourth and fifth cell phones 102, 104, 10, 108 simultaneously (as shown) or serially.

Figure 2:
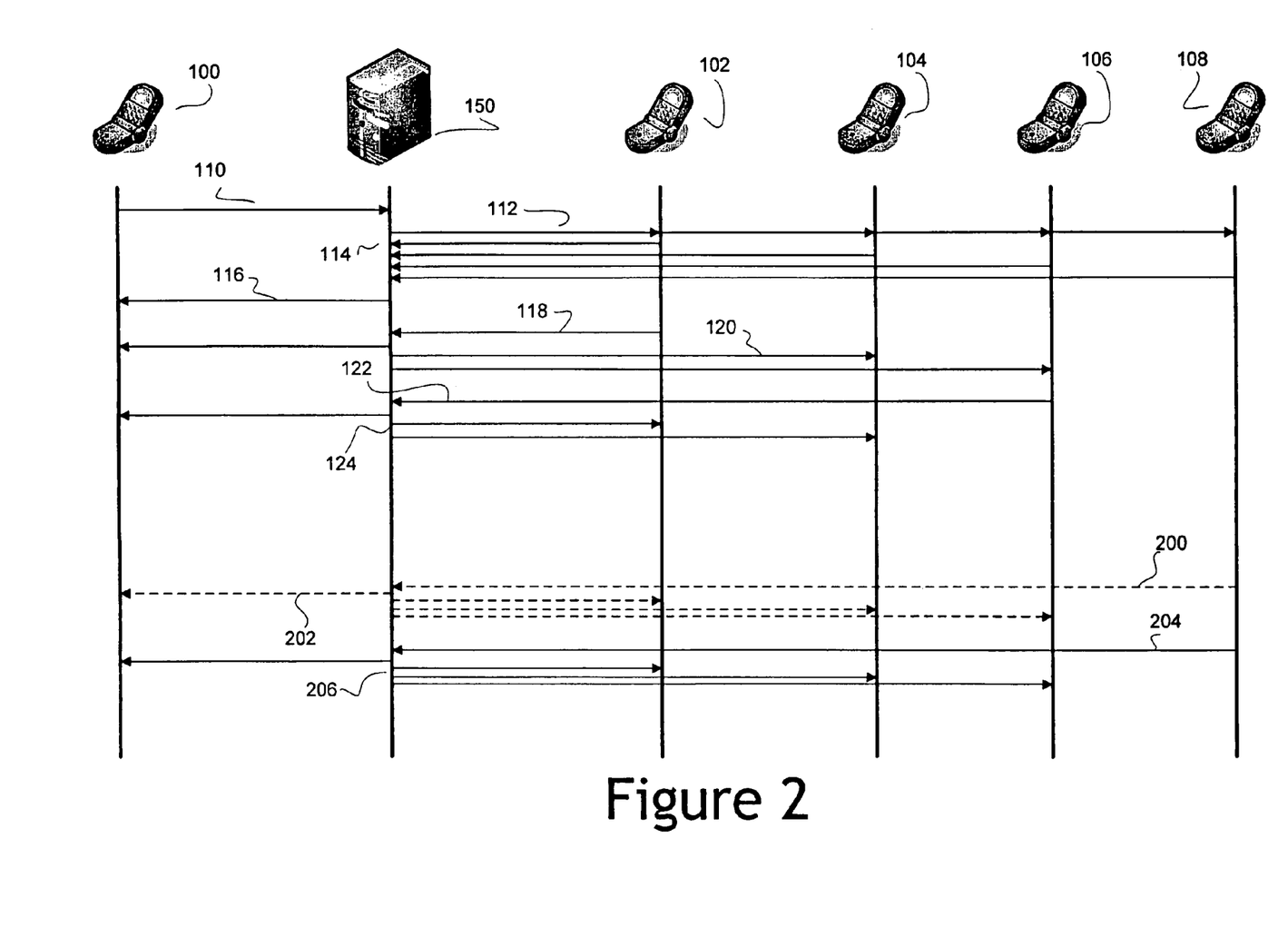
FIG. 2 is a signal diagram of communication in a press-to-talk system having communication devices according to the present invention located therein.

In FIG. 2, each of the second, third and fourth cell phones 102, 104, 106 accepts the request and sends an acknowledgement back to the network 150. However, the fifth cell phone 108 does not accept the request as it is already participating in a voice call and so is busy. This information is also sent back to the network 150. This is represented by a first signal group 114. The network 150 may or may not inform the first cell phone 100 of the status of each of the second, third, fourth and fifth cell phones 102, 104, 106 and 108. If the network 150 does inform the first cell phone 100 of the status of each of the second, third, fourth and fifth cell phones 102, 104, 106 and 108, a third signal 116 is sent from the network to the first cell phone 100. The third signal is omitted if the network does not inform the first cell phone 100 of the statuses of the other phones.

The status (accepted or declined) of each cell phone 100, 102, 104, 106, 108 is held by the network 150. If the status information is sent by the network 150, the status information is displayed to the user. It may also be held by one or more of the other cell phones. In the case of a Motorola GIR CDMA client/server architecture being used, the identities of a first user already in a call is not identified to a second user of a phone that then joins the call. However, once the first user speaks, the identity of the first user is made available to the phone of the second user. This may then be displayed to the second user if required.

Following the calls being answered at the second, third and fourth cell phones 102, 104, 106, the user of the second cell phone 102 is the first to speak. The speech is converted, and an identifier added, and the result is transmitted to the network 150 as a fourth signal 118. The network 150 forwards the fourth signal 118 to the first, third and fourth cell phones 100, 104, 106. This is represented as a second signal group 120. Only one user can speak at a time. Thus, the users of the first, third and fourth cell phones 100, 104, 106 listen to the user of the second cell phone 102.

PTT requires the network 150 to be continuously connected to all of the first, second, third and fourth cell phones 100, 102, 104, 106 using a half duplex-channel. Therefore, en a user presses the button to talk, that user has exclusive access to speak to the network 150 over the channel, and thus control the channel. This speech is relayed by the network 150 to each of the other cell phones. Any suitable PTT technique may be used.

When received by the first cell phone 100, the signal for the first cell phone 100 contained in the second signal group 120 is fed from the antenna 175 to the receiver 165, where it is downconverted and demodulated.

Figure 3:
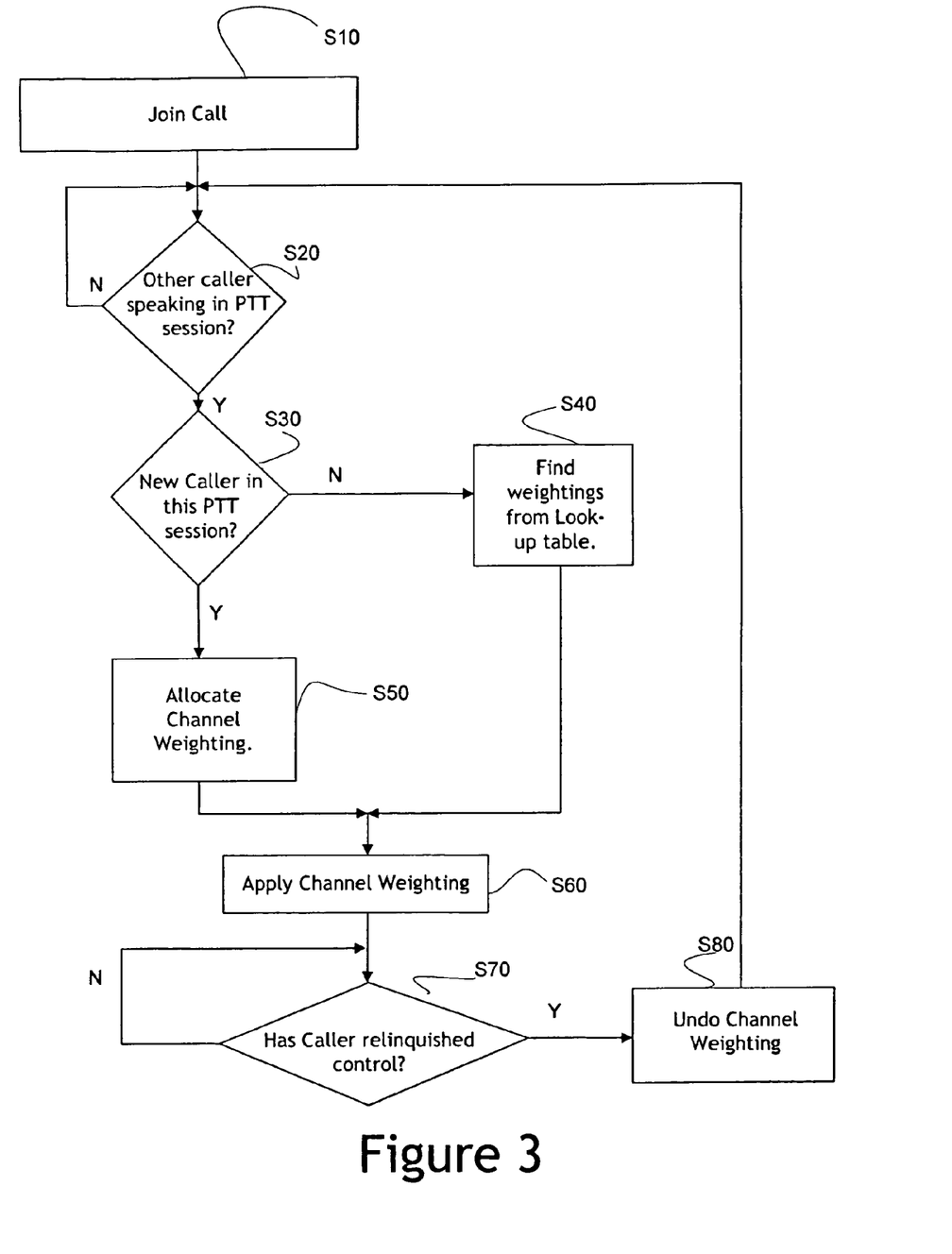
FIG. 3 is a flow diagram describing a method according to the present invention.

The downconverted signal is fed to the signal processor 151 which determines that another cell phone (the second cell phone 102) is controlling the channel (step S20 of FIG. 3). Accordingly, the signal processor 151 knows to listen only to the channel until the second cell phone relinquishes control.

The signal processor 150 feeds the part of the received downconverted signal to the sound processor 135. In particular, the signal processor 151 feeds speech data and data identifying the cell phone controlling the channel.

The sound processor 135 identifies that the signal originated from, in this case, the second cell phone 102, and searches the memory 140 to establish whether the second cell phone 102 has previously taken control of the channel (i.e. spoken to the other cell phones) since the first cell phone 100 initiated the call (i.e. in this PTT session). This is step S30 of FIG. 3.

As this is the first time that the second cell phone 102 has spoken in this PTT session, the sound processor 135 determines a suitable channel weighting to attribute to the second cell phone 102. This is step S50 of FIG. 3. In order to do this, in this example, the sound processor 135 determines whether any other cell phones have spoken in this session. As, at this point, no other cell phones have spoken, so the sound processor 135 automatically attributes a weighting of 100% to the left channel and 0% to the right channel. This channel weighting is stored with a suitable cell phone identifier in the memory 140. The channel weighting is then applied to the channels (step S60 of FIG. 3). This means that the voice of the user of the second cell phone 102 is output only using the left speaker 120, giving the user of the first cell phone 100 the impression that the user of the second cell phone 102 is located on his or her left side.

If the second cell phone 102 had previously spoken in this PTT session, the sound processor 135 would have extracted the left and right channel weightings from the memory 140 associated with the second cell phone 102. This is step S40 of FIG. 3.

The weighted signal is fed to the amplifier 130 and subsequently onto the speakers 120, 125. Therefore, in this case, only the left speaker 120 outputs the voice of the user of the second cell phone 102.

The second cell phone 102 relinquishes control of the channel when the user of the second cell phone 102 does not want to speak anymore and so releases the button 145. This is step S70 of FIG. 3. When this occurs, the channel weighting is not applied to any incoming speech signals (step S80 of FIG. 3).

The user of the fourth cell phone 106 is next to speak. The speech is converted into signal 116 and transmitted to the network 150. This is a fifth signal 122. The network 150 forwards the information to the first, second and third cell phones 100, 102, 104. This is represented by the third signal group 124.

A similar procedure to that outlined above takes place. The downconverted and demodulated signal containing speech and cell phone identifying data is sent to the sound processor 135, which checks Whether the fourth cell phone 106 has previously spoken during this session (S30). As this is the first time that the fourth cell phone 106 has controlled the channel, the sound processor 135 determines the channel weighting to be attributed to the fourth cell phone 106 (S50). As the second cell phone 102 has spoken and thus a channel weighting has been attributed to it, the sound processor 135 automatically attributes a weighting of 100% to the right channel and 0% to the left channel. This means that the voice of the user of the fourth cell phone 106 is output only using the right speaker 125, giving the user of the first cell phone 100 the impression that the user of the fourth cell phone 106 is located on his or her right side (S60). This provides an effective distance between the positions, in sound-space, of the users of the second and fourth cell phones 102, 106. The distance, in this case angular distance, is sufficient such that the user can differentiate the positions between the voice of the users of the second and fourth cell phones 102, 106. This reduces confusion as to which user is speaking at any particular time.

The weighted signal is fed to the amplifier 130 and subsequently onto the speakers 120, 125. Therefore, only the right hand speaker 125 outputs the voice of the user of the fourth cell phone 106.

The fourth cell phone 106 relinquishes control of the channel when the user of the fourth cell phone 106 does not want to speak anymore. This is step S70 of FIG. 3. When this occurs, the channel weighting is not applied to any incoming speech signals (step S80 of FIG. 3).

The user of the third cell phone 104 is next to speak. The speech is converted into signal 116 and transmitted to the network 150. This is a sixth signal 126. The network 150 forwards the information to the first, second and fourth cell phones 100, 102, 106, respectively. This is fourth signal group 128.

A similar procedure to that outlined above takes place. The downcoverted and demodulated sound signal containing speech and cell phone identifying data is sent to the sound processor 135, which checks whether the third cell phone 104 has previously taken control of the channel during this PTT session (S30). As this is the first time the third cell phone has taken control of the channel, the sound processor 135 determines the channel weighting to attribute to the third cell phone 106 (S50). As the second and fourth cell phones 102, 106 have already spoken, the sound processor 135 automatically attributes a weighting of 50% to the left channel and 50% to the right channel.

The weighted signal is fed to the amplifier 130 and subsequently onto the speakers 120, 125. Therefore, both the left and right hand speakers 120, 125 equally output the voice of the user of the third cell phone 102 (S60), giving the user of the first cell phone 100 the impression that the user of the third cell phone 104 is located directly in front of him or her.

This weighting again provides sufficient angular distance between the positions, in sound-space, of the users of the second, fourth and third cell phones 102, 106, 104, for the user of the first cell phone 100 to differentiate between the voices of the users of the cell phones.

The third cell phone 104 relinquishes control of the channel often the user of the third cell phone 104 does not want to speak anymore. This is step S70 of FIG. 3. When this occurs, the channel weighting is not applied to any incoming speech signals (step S80 of FIG. 3).

Figure 4:
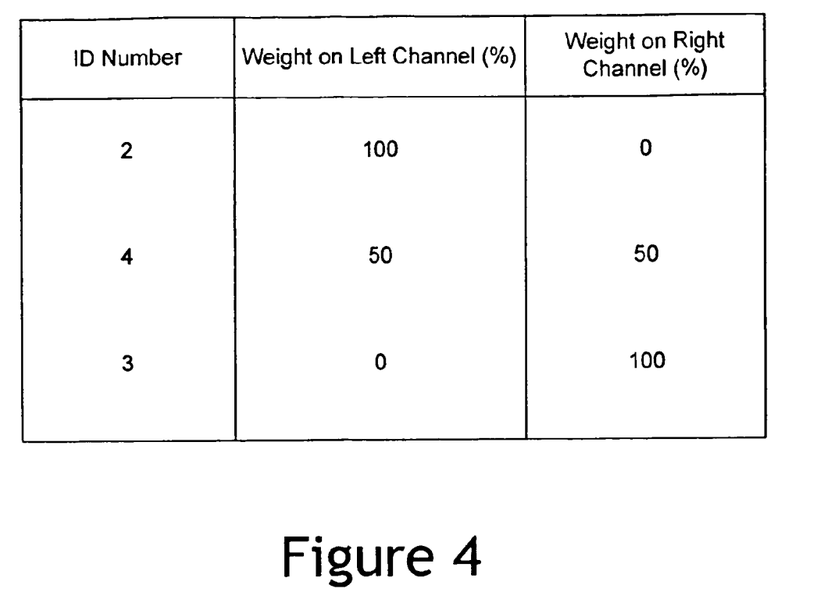
FIG. 4 is a diagram representing a look-up table contained within the FIG. 1 communication device when communicating according to the part of the scheme illustrated in FIG. 2.

Referring to FIG. 4, a look-up table stored in the memory 140 is shown. This associates cell phone ID numbers with weighting factors.

Figure 5:
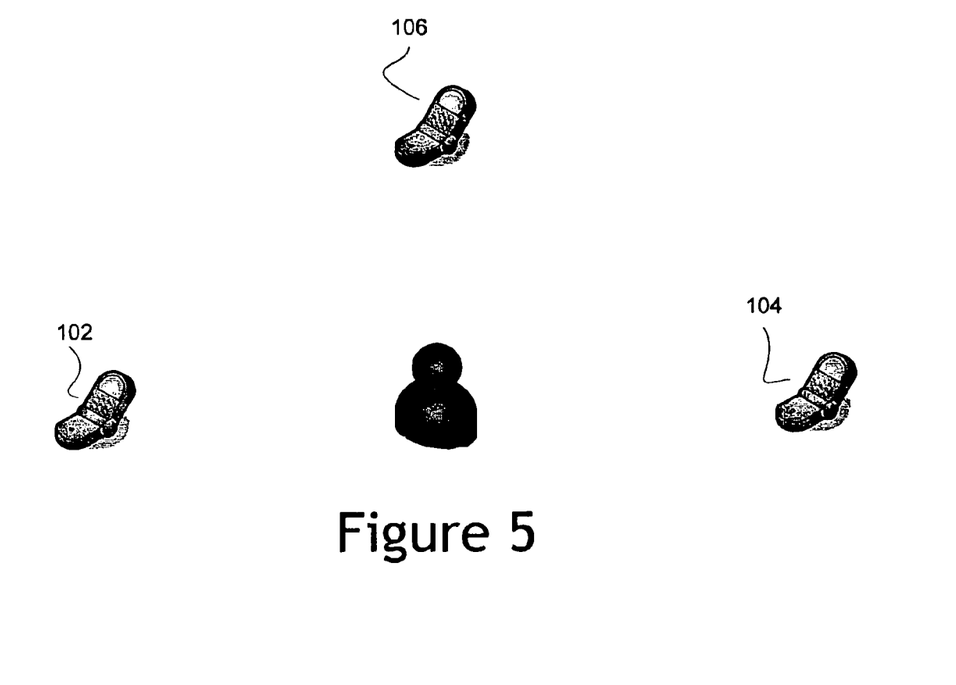
FIG. 5 is a diagram showing the spatial location of each of the other communication devices in relation to one communication device according to the present invention.

Referring to FIG. 5, the user of the first cell phone has the users which have spoken during this PTT session positioned equally around him or her. As the users are positioned equally around the user, the angular distance between each user is maximised.

The skilled person will appreciate that the angular distance is maximised in this case to ensure that the location of each of the other users (and therefore identity) can be more easily distinguished by the user of the first cell phone 100. However, it is not necessary to maximise the distance in order for the user to distinguish the location of the other users. Indeed, any alternative algorithm may be implemented which provides this result. One such alternative is described hereinafter with reference back to FIG. 2.

Referring to FIG. 2, the fifth cell phone 108 has finished the pre-existing voice call and requests to join this PTT session. The fifth cell phone 108 sends a request to join signal 200 (signified by a clotted line) to the network 150. This request is distributed by the network 150 to each of the first, second, third and fourth cell phones 100, 102, 104, 106 as shown by signal group 202. It will be appreciated that the time by which the user of the fifth cell phone 108 must join the PPT session is dependent upon the particular implementation of the invention. For example, in the described embodiment, the user of the fifth cell phone 108 joins the PTT session a considerable length of time after the session began. However, it is understood that that other implementations may require the user of the fifth cell phone 108 to join the PTT session within a short period of time (for example 2 seconds).

The user of the fifth cell phone 108 now speaks. A similar procedure to that outlined above takes place. The downconverted and demodulated sound signal containing speech and cell phone identifying data is sent to the sound processor 135, which checks whether the fifth cell phone 104 has previously spoken during this session (S30). As the fifth cell phone 108 has not spoken during this PTT session, the sound processor 135 determines the channel weighting to attribute to the fifth cell phone 108 (S50). As the second, fourth and third cell phones 102, 106, 104 have already spoken and thus been allocated weighting factors, the sound processor 135 automatically attributes a weighting of 75% to the left channel and 25% to the right channel. This means that the voice of the user of the fifth cell phone 108 is output more from the left speaker 120 than the right speaker 125 (S60). This gives the user of the first cell phone 100 the impression that the user of the fifth cell phone 108 is located directly between the second and third cell phones 102, 104 i.e. at 450 from the left hand speaker 120.

As is seen, the embodiment described in relation to FIG. 2 does not maximise the angular distance between each of the second, third, fourth and fifth cell phones 102, 104, 106, 108. However, the angular distance between each cell phone is such that the user of the first cell phone 100 can distinguish between each of the users of the second, third, fourth and fifth cell phones 102, 104, 106, 108. The newly allocated weighting factor gives rise to the fifth cell phone 108 having maximum separation between the second and fourth cell phones 102, 106.

Figure 6:
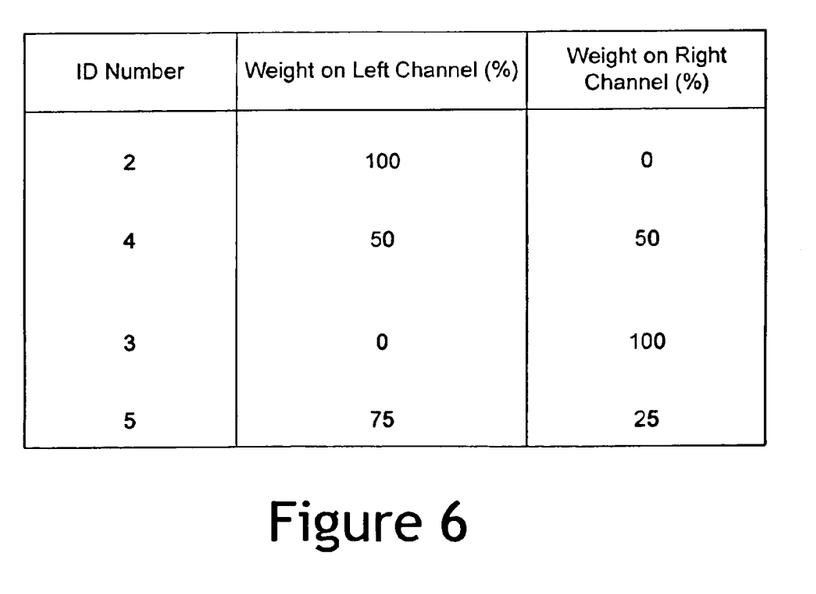
FIG. 6 is a diagram representing a look-up table contained within the FIG. 1 communication device when communicating according to the remaining part of the scheme illustrated in FIG. 2.

Referring to FIG. 6, the look-up table stored in the memory 140 is shown.

Figure 7:
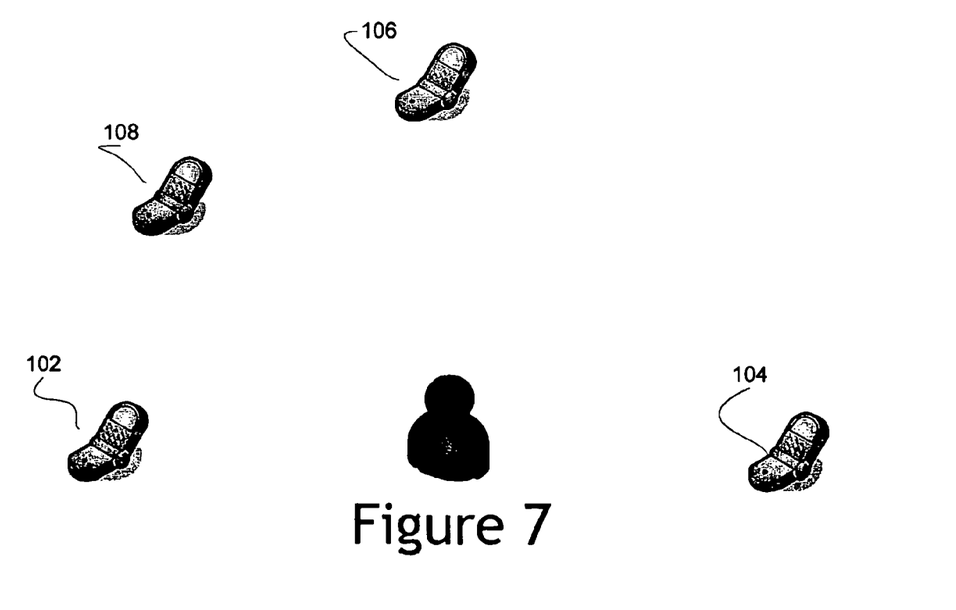
FIG. 7 is a diagram showing the spatial location of other communication devices in relation to the user of the FIG. 1 communication device.

Referring to FIG. 7, even when other users join the session, the user of the first cell phone 100 has the users which have spoken during the PTT session positioned around him or her so that the location of each other user in sound-space is distinguishable.

It is preferable that even if a user were to leave the session, for example, to attend a voice call, the angular position of that user would remain so if the user were to re-join the session, he or she would be allocated the weighting and thus the same "location" in sound-space.

Although the foregoing relates to the first cell phone 100, it is understood that the second, third, fourth and fifth cell phones 102, 104, 106, 108 may or may not also include the embodiments according to the present invention.

The present invention can be implemented using any system where the identity of a cell phone whose user is speaking is provided to the network 150 and/or other cell phones. For example, in CDMA PTT, the network 150 needs to know the identity of each cell phone in order to correctly route audio data. This information is used to identify the cell phone which is currently talking for the purposes of this invention.

It is understood that the foregoing is not only be relevant to PTT systems. For example, it may be implemented wherever a group of people wish to talk, for example in video or audio conferencing. It is also understood that the invention is not limited to two channel systems. For example, where a quadraphonic sound system is supported, the channel weightings for each channel may be such that the other users appear to be located behind the user of the communication system. This provides increased flexibility to the system.

It is envisaged that the foregoing method is implemented in software stored in memory within a cell phone. This software may be stored before installation on the phone on ants kind of computer-readable medium such as ROM, RAM, CD, DVD, floppy disk, a carrier or a server. It may also be transient as a signal, for example transmitted over the Internet or the like. Moreover, it will be apparent that many modifications and variations may be made without departing from the scope and spirit of the invention.

What is claimed is:

1. A communication apparatus operable to communicate with a plurality of devices, each device having a respective identifier, the communication apparatus comprising:
a processor configured to establish automatically plural weighting factors, each weighting factor to be applied to an audio signal originating from a respective one of the plurality of devices, according to a predetermined criterion in order to provide an audible distance between said devices when said audio signals are output from at least two speakers;
wherein, a first and a second of said speakers are located on said communication apparatus for providing sound of a left channel and a right channel respectively, and said weighting factors are applied to the relative amplitudes of sounds of the left channel and the right channel to simulate a direction of arrival of said audio signals from an individual one of the devices.

2. A communication apparatus according to claim 1, wherein the predetermined criterion is dependent upon the number of devices for which weighting factors have been established.

3. A communication apparatus according to claim 2, wherein a weighting factor established for a device is retained when that device leaves a call, and the weighting factor is used again when that device subsequently rejoins the call.

4. A communication apparatus according to claim 1, wherein a weighting factor established for a device is not altered during the duration of a call.

5. A communication apparatus according to claim 1, wherein weighting factors established for devices are maintained for the duration of a call.

6. A communication apparatus according to claim 5, wherein the weighting factors are abandoned at the end of a call.

7. A communication apparatus according to claim 1, wherein a weighting factor established for a device is retained when that device leaves a call, and the weighting factor is used again when that device subsequently rejoins the call.

8. A communication apparatus according to claim 6, wherein the apparatus is a mobile communications terminal.

9. A communication apparatus according to claim 1, wherein a different weighting factor is established for each device.

10. A communication apparatus according to claim 1, wherein the processor is configured to maximise the audible distance between each of the said devices when output from at least two speakers.

11. A communication apparatus according to claim 1, wherein the apparatus is a mobile communications terminal.

12. A method of managing a communication apparatus which is operable to communicate with a plurality of devices, each device having a respective identifier, the method comprising:
establishing automatically plural weighting factors, each weighting factor to be applied to an audio signal originating from a respective one of the plurality of devices, according to a predetermined criterion in order to provide an audible distance between said devices when said audio signals are output from a plurality of speakers;
locating, in said communication apparatus, a first and a second of said speakers for providing sound of a left channel and a right channel respectively; and applying said weighting factors to the relative amplitudes of sounds of the left channel and the right channel to simulate a direction of arrival of said audio signals from an individual one of the devices.

13. A method according to claim 12 wherein the predetermined criterion is dependent upon the number of devices for which weighting factors have been established.

14. A method according to claim 12, wherein a weighting factor established for a device is retained when that device leaves the call, and the weighting factor is used again when that device subsequently rejoins the call.

15. A computer readable medium having a stored computer program for use with a communication apparatus which is operable to communicate with a plurality of devices, each device having a respective identifier, the program comprising computer code for performing the steps of:

establishing automatically plural weighting factors, each weighting factor to be applied to an audio signal originating from a respective one of the plurality of devices, according to a predetermined criterion in order to provide an audible distance between said devices when said audio signals are output from a plurality of speakers;

locating, in said communication apparatus, a first and a second of said speakers for providing sound of a left channel and a right channel respectively; and applying said weighting factors to the relative amplitudes of sounds of the left channel and the right channel to simulate a direction of arrival of said audio signals from an individual one of the devices.

* * * * *

UNITED STATES PATENT AND TRADEMARK OFFICE
CERTIFICATE OF CORRECTION

| | | |
|---|---|---|
| PATENT NO. | : 7,433,716 B2 | Page 1 of 1 |
| APPLICATION NO. | : 11/077190 | |
| DATED | : October 7, 2008 | |
| INVENTOR(S) | : Denton | |

It is certified that error appears in the above-identified patent and that said Letters Patent is hereby corrected as shown below:

In column 8, line 29, in claim 8, delete "claim 6" and insert --claim 7--, therefor.

Signed and Sealed this

Ninth Day of November, 2010

David J. Kappos
*Director of the United States Patent and Trademark Office*